United States Patent
Zhou et al.

(10) Patent No.: US 12,549,819 B2
(45) Date of Patent: Feb. 10, 2026

(54) LIVE VOTING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Jianren Zhou, Beijing (CN); Can Yang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/771,982

(22) Filed: Jul. 12, 2024

(65) Prior Publication Data

US 2024/0373101 A1 Nov. 7, 2024

Related U.S. Application Data

(63) Continuation of application No. PCT/CN2023/071672, filed on Jan. 10, 2023.

(30) Foreign Application Priority Data

Jan. 12, 2022 (CN) .......................... 202210034101.5

(51) Int. Cl.
*H04N 21/475* (2011.01)
*H04N 21/431* (2011.01)
*H04N 21/4788* (2011.01)

(52) U.S. Cl.
CPC ..... *H04N 21/4758* (2013.01); *H04N 21/4312* (2013.01); *H04N 21/4788* (2013.01)

(58) Field of Classification Search
CPC ........... H04N 21/4758; H04N 21/4312; H04N 21/4788
See application file for complete search history.

(56) References Cited

U.S. PATENT DOCUMENTS

2019/0172080 A1* 6/2019 Wirasinghe ........ G06Q 30/0201
2019/0394248 A1* 12/2019 Danker .................. H04L 67/75
(Continued)

FOREIGN PATENT DOCUMENTS

CN 106534954 A 3/2017
CN 106791981 A 5/2017
(Continued)

OTHER PUBLICATIONS

International Search Report and Written Opinion for PCT/CN2023/071672, mailed May 18, 2023, 12 pages.
(Continued)

*Primary Examiner* — Nathan J Flynn
*Assistant Examiner* — Christine A Kurien
(74) *Attorney, Agent, or Firm* — Astute IP Law Group

(57) ABSTRACT

The present disclosure provides a live voting method and apparatus, electronic device, storage medium, and program product. The live voting method includes: displaying a voting result region and a voting input region of a target voting in a live streaming page, voting option identifiers corresponding to a plurality of voting options and voting counts corresponding to the plurality of voting options are displayed in the voting result region, and voting option controls corresponding to the plurality of voting options are displayed in the voting input region; and initiating, in response to a trigger operation for a voting option control, voting for a target voting option corresponding to the voting option control on which the trigger operation is performed, and sending a comment corresponding to the target voting option.

12 Claims, 10 Drawing Sheets

(56) References Cited

U.S. PATENT DOCUMENTS

| | | | |
|---|---|---|---|
| 2020/0286318 A1 | 9/2020 | Lang et al. | |
| 2022/0280870 A1* | 9/2022 | Xiao | A63F 13/533 |
| 2023/0396826 A1* | 12/2023 | Apurvi | H04N 21/2187 |

FOREIGN PATENT DOCUMENTS

| | | | |
|---|---|---|---|
| CN | 106792229 A | 5/2017 | |
| CN | 107172477 A | 9/2017 | |
| CN | 107579959 A | 1/2018 | |
| CN | 108111500 A | 6/2018 | |
| CN | 109874059 A | 6/2019 | |
| CN | 305887521 S | 6/2020 | |
| CN | 111526406 A | 8/2020 | |
| CN | 112218103 A | 1/2021 | |
| CN | 112533068 A | 3/2021 | |
| CN | 112546621 A | 3/2021 | |
| CN | 113423017 A | 9/2021 | |
| CN | 114390360 A | 4/2022 | |
| CN | 114390360 B | 1/2024 | |
| JP | 2001-244902 A | 9/2001 | |
| JP | 2017-167860 A | 9/2017 | |
| JP | 2021-057686 A | 4/2021 | |
| JP | 6923830 B1 | 8/2021 | |

OTHER PUBLICATIONS

Office Action for Chinese Patent Application No. 202210034101.5, mailed Jun. 29, 2023, 11 pages.

Notice to Grant for Chinese Patent Application No. 202210034101.5, mailed Jan. 2, 2024, 6 pages.

Zhao Baihui et al., "Research on the Interaction Design of Social Sharing in Social Live Video", Jiangnan University, 2018, 8 pages, with Machine translation.

Office Action received for Japanese Patent Application No. 2024-542062, mailed on Jun. 17, 2025, 12 pages (6 pages of English Translation and 6 pages of Original Document).

\* cited by examiner

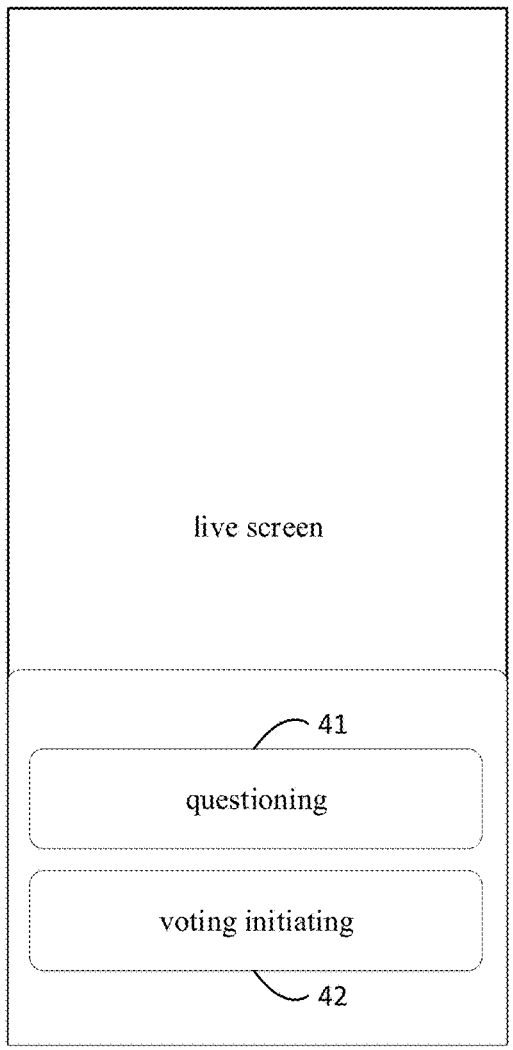

Fig. 7

| displaying a voting result region and a voting input region of the target voting in a live streaming page, voting option identifiers corresponding to a plurality of voting options and voting counts corresponding to the plurality of voting options are displayed in the voting result region, and voting option controls corresponding to the plurality of voting options are displayed in the voting input region | S301 |

| in response to a trigger operation for any voting option control, initiating a voting for a target voting option corresponding to the voting option control on which the trigger operation is performed, and sending a comment corresponding to the target voting option | S302 |

Fig. 8

LIVE VOTING METHOD AND APPARATUS, ELECTRONIC DEVICE, AND STORAGE MEDIUM

CROSS-REFERENCE TO RELATED APPLICATIONS

The present application is a continuation of International Patent Application No. PCT/CN2023/071672, filed on Jan. 10, 2023, which claims the priority of the Chinese patent application 202210034101.5 filed with the China National Intellectual Property Administration on Jan. 12, 2022, the entire contents of which are hereby incorporated by reference in their entireties.

TECHNICAL FIELD

The present disclosure relates to the field of computer technology, in particular to a live voting method and apparatus, an electronic device, a storage medium and a program product.

BACKGROUND

During the live streaming, when a streamer initiates voting, viewers can participate in the voting. However, the voting modes in prior art are complicated and cannot meet the requirements of the viewers.

SUMMARY

The present disclosure provides a live voting method and apparatus, an electronic device, a storage medium and a program product, so as to simplify the operation required for voting in live streaming process.

The present disclosure provides a live voting method, which includes:
 displaying a voting result region and a voting input region of a target voting in a live streaming page, voting option identifiers corresponding to a plurality of voting options and voting counts corresponding to the plurality of voting options are displayed in the voting result region, and voting option controls corresponding to the plurality of voting options are displayed in the voting input region; and
 initiating, in response to a trigger operation for a voting option control, voting for a target voting option corresponding to the voting option control on which the trigger operation is performed, and sending a comment corresponding to the target voting option.

The present disclosure further provides a live voting apparatus, which includes:
 an input region display module, configured to display a voting result region and a voting input region of a target voting in a live streaming page, voting option identifiers corresponding to a plurality of voting options and voting counts corresponding to the plurality of voting options are displayed in the voting result region, and voting option controls corresponding to the plurality of voting options are displayed in the voting input region; and
 a voting module, configured to, in response to a trigger operation for a voting option control, initiate voting for a target voting option corresponding to the voting option control on which the trigger operation is performed, and send a comment corresponding to the target voting option.

The present disclosure further provides an electronic device, which includes:
 at least one processor; and
 a memory, configured to store at least one program;
 the at least one program, when executed by the at least one processor, cause the at least one processor to implement the live voting method according to the embodiments of the present disclosure.

The present disclosure further provides a storage medium, on which computer program is stored, the computer program, when executed by a processor, implements the live voting method according to the embodiments of the present disclosure.

The present disclosure further provides a program product, the computer program product, when executed by a computer, cause the computer to implement the live voting method according to the embodiments of the present disclosure.

BRIEF DESCRIPTION OF DRAWINGS

FIG. 7 is a diagram of another interaction panel according to embodiments of the present disclosure;
FIG. 8 is a flowchart of yet another live voting method according to embodiments of the present disclosure.

DETAILED DESCRIPTION

Figure 1:
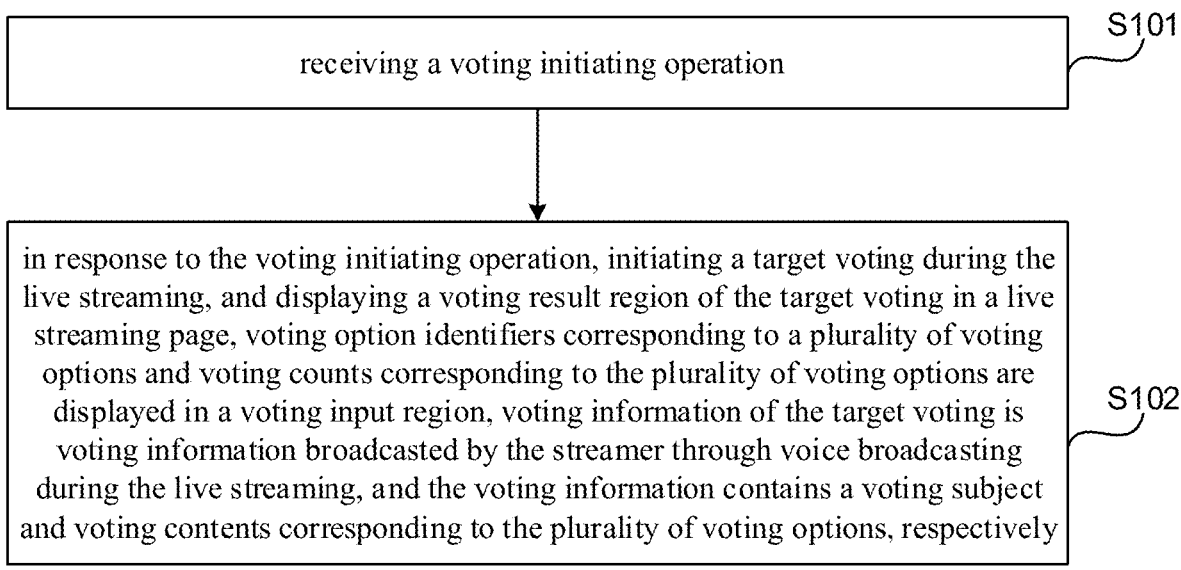
FIG. 1 is a flowchart of a live voting method according to embodiments of the present disclosure.

Embodiments of the present disclosure will be described in more detail below with reference to the drawings. While certain embodiments of the present disclosure are shown in the drawings, the present disclosure may be embodied in various forms and should not be construed as limited to the embodiments set forth herein. Rather, these embodiments are provided for understanding the present disclosure. It should be understood that the drawings and embodiments of the present disclosure are only for exemplary purposes, and are not intended to limit the protection scope of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

The concepts such as "first", "second", etc. mentioned in the present disclosure are only used to distinguish different devices, modules or units, and are not used to limit the order of functions performed by these devices, modules or units or interdependence relationship.

The modifications of "a" and "a plurality" mentioned in the present disclosure are illustrative rather than restrictive, and those skilled in the art should understand that unless the context clearly indicates otherwise, they should be understood as "one or a plurality of".

The names of messages or information exchanged between multiple devices in the embodiments of the present disclosure are only for illustrative purposes, and are not intended to limit the scope of these messages or information.

FIG. 1 is a flowchart of a live voting method according to embodiments of the present disclosure. The method can be performed by a live voting apparatus. The apparatus can be realized by software and/or hardware, and can be configured in an electronic device, a mobile phone or a tablet computer. The live voting method provided by the embodiments of the present disclosure is applicable for scenarios where a streamer initiates voting during the live streaming. As shown in FIG. 1, the live voting method provided by the embodiments may include the following steps.

In S101, a voting initiating operation is received.

The voting initiating operation refers to the operation of initiating a voting during the live streaming, such as a trigger operation for triggering a voting initiating control.

When intending to initiate the voting during the live streaming, a streamer can instruct an electronic device to display the voting initiating control through the corresponding trigger operation and trigger the voting initiating control.

In S102, in response to the voting initiating operation, a target voting is initiated during the live streaming, and a voting result region of the target voting is displayed in a live streaming page, voting option identifiers corresponding to a plurality of voting options and voting counts corresponding to the plurality of voting options are displayed in a voting input region, voting information of the target voting is voting information broadcasted by the streamer through voice broadcasting during the live streaming, and the voting information contains a voting subject and voting contents corresponding to the plurality of voting options, respectively.

In the embodiments, when the voting initiating operation is received, a preset voting can be directly initiated, and the streamer can broadcast the voting subject corresponding to the preset voting initiated by the streamer and the voting contents corresponding to the plurality of voting options through voice broadcasting during the live streaming. In other words, after the preset voting is initiated, the streamer can describe any desired topic as the voting subject, and describe the voting contents corresponding to the plurality of voting options during the live streaming through voice broadcasting, without the need for manual input of the voting subject and voting contents. Therefore, the operation required for the streamer to initiate voting can be simplified, thus minimizing disruption to live streaming.

In addition, after live streaming is initiated, only the voting option identifier corresponding to each voting option is displayed in the live streaming page, and there is no need to display the voting subject and the voting contents corresponding to the plurality of voting options in the live streaming page in the form of pop-ups or the like, so the embodiments can also reduce the obstruction to a live screen during or after voting initiation, thus providing convenience for the streamer to view the live screen.

The target voting can be a voting initiated during the live streaming, or a voting preset by developers, that is, the preset voting. The preset voting may contain voting option identifiers corresponding to a plurality of voting options, and there is no preset voting subject and voting content. Each voting option identifier may be a preset voting option identifier irrelevant to the voting content of a voting option corresponding to the voting option identifier. For example, different voting option identifiers may be different numbers, different expressions, or other different characters. The voting content corresponding to a voting option may be the option content actually corresponding to the voting option. The voting result region of the target voting may display the voting option identifiers corresponding to the plurality of voting options of the target voting and the voting counts (i.e. the number of voters) corresponding to the plurality of voting options. The voting information of the target voting may contain a voting subject of the target voting and voting contents corresponding to a plurality of voting options.

Figure 2:
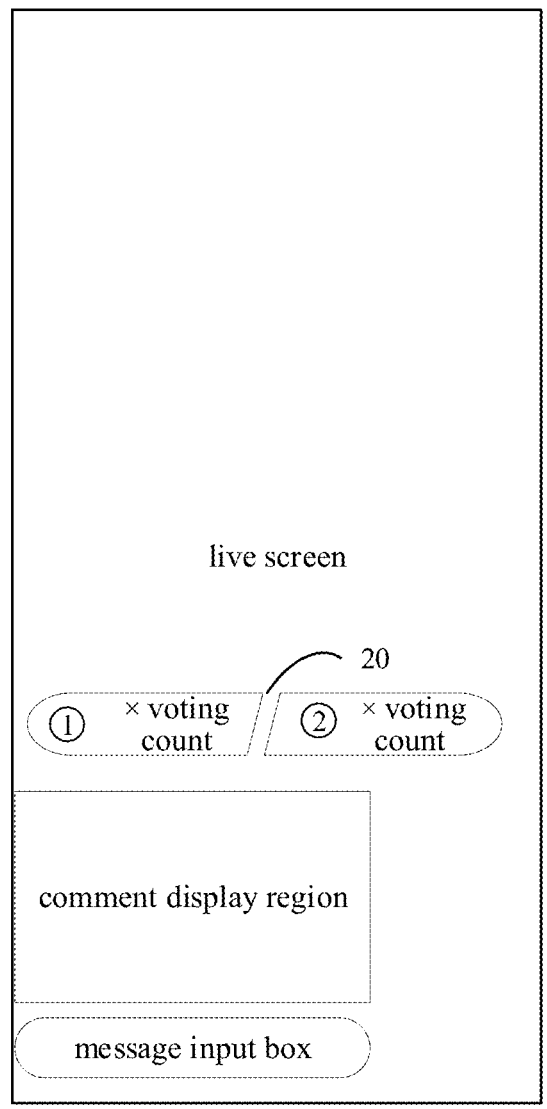
FIG. 2 is a diagram of a live streaming page on a streamer side according to embodiments of the present disclosure.

As shown in FIG. 2, when receiving the voting initiating operation from the streamer, the electronic device can initiate the target voting during the live streaming in response to the voting initiating operation, and display the voting result region 20 of the target voting in the live streaming page on a streamer side, for example, the voting result region 20 of the target voting can be displayed above a comment display region of the live streaming page. Further, the remaining voting time for the target voting can be shown on the live streaming page, and/or comments sent by users during the live streaming can be displayed in the comment display region of the live streaming page. The comments may include comments input and sent by the streamer and/or users through a message input box, and comments sent by users by triggering corresponding voting option controls in a voting input region.

According to the live voting method provided by the embodiments, first, a voting initiating operation is received; and then, in response to the voting initiating operation, a target voting is initiated during the live streaming, and a voting result region of the target voting is displayed in a live streaming page, the voting result region displays voting option identifiers corresponding to a plurality of voting options and voting counts corresponding to the plurality of voting options, voting information of the target voting is voting information broadcasted by the streamer through voice broadcasting during the live streaming, and the voting information contains a voting subject and voting contents corresponding to the plurality of voting options. By adopting the above technical scheme, when the voting initiating operation is received, the preset voting is directly initiated, and the streamer broadcasts the voting information of the initiated preset voting through voice broadcasting during the live streaming, without the need for manual input of the voting information. Therefore, the operation required for the streamer to initiate voting can be simplified, thus minimizing disruption to live streaming.

Figure 3:
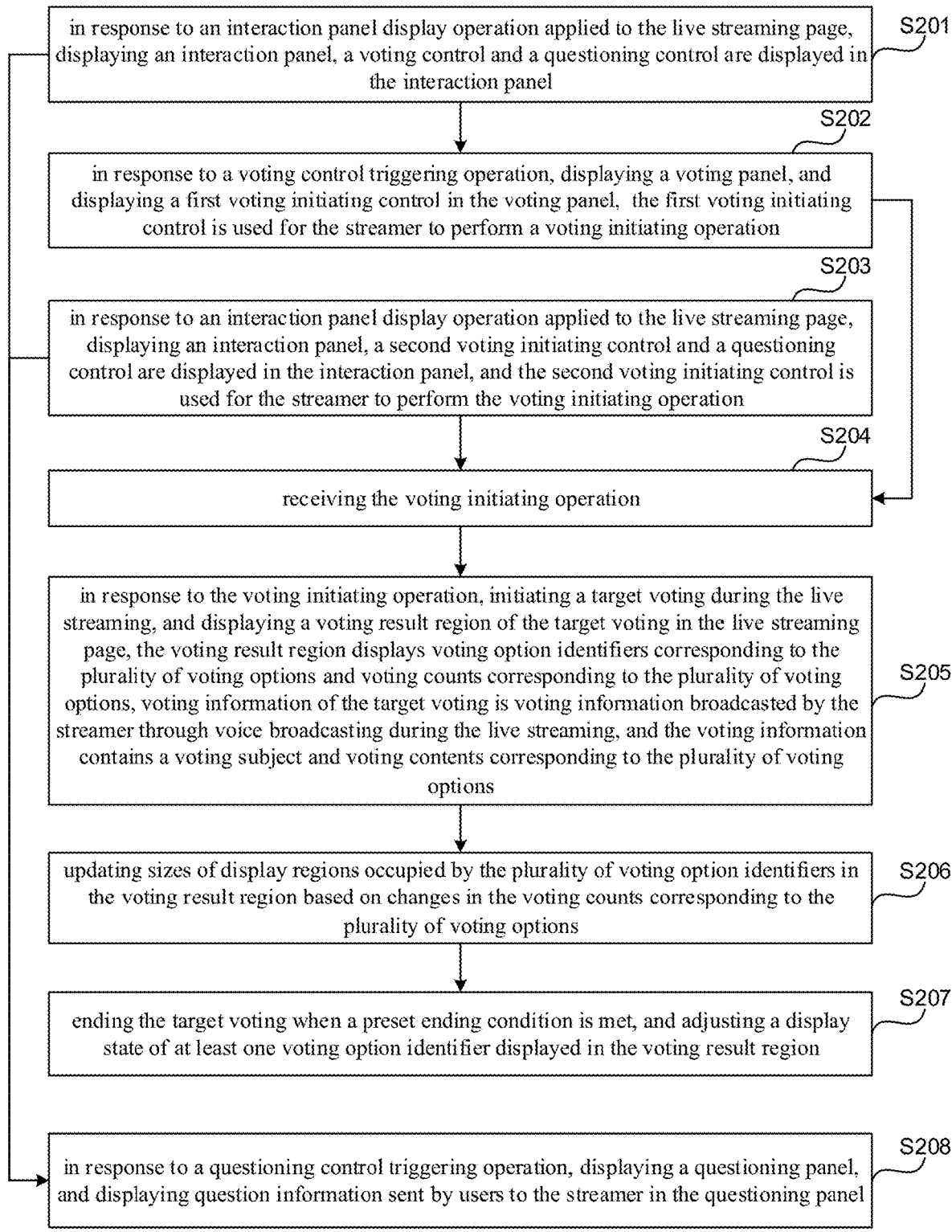
FIG. 3 is a flowchart of another live voting method according to embodiments of the present disclosure.

FIG. 3 is a flowchart of another live voting method according to embodiments of the present disclosure. The scheme in the embodiments can be combined with one or more alternative schemes in the above embodiments. Optionally, after displaying the voting result region of the target voting in the live streaming page, the method further includes: updating sizes of display regions occupied by the plurality of voting option identifiers in the voting result region based on changes in the voting counts corresponding to the plurality of voting options.

Optionally, the live voting method provided by the embodiments further includes: ending the target voting when a preset ending condition is met, and adjusting a display state of at least one voting option identifier displayed in the voting result region.

Optionally, before the voting initiating operation is received, the method further includes: in response to an interaction panel display operation applied to the live streaming page, displaying an interaction panel, voting controls are displayed in the interaction panel; and in response to a voting control triggering operation, displaying a voting panel, and displaying a first voting initiating control in the voting panel, the first voting initiating control is used for the streamer to perform the voting initiating operation.

Optionally, before the voting initiating operation is received, the method further includes: in response to an interaction panel display operation applied to the live streaming page, displaying an interaction panel, a second voting initiating control is displayed in the interaction panel, and the second voting initiating control is used for the streamer to perform the voting initiating operation.

Optionally, a questioning control is displayed in the interaction panel, and the method further includes: in response to a questioning control triggering operation, displaying a questioning panel, and displaying question information sent by users to the streamer in the questioning panel.

As shown in FIG. 3, the live voting method provided by the embodiments may include the following steps.

In S201, in response to an interaction panel display operation applied to the live streaming page, an interaction panel is displayed, and S202 or S208 is performed. A voting control and a questioning control are displayed in the interaction panel.

The interaction panel display operation may be an operation of instructing the electronic device to display the interaction panel, such as an operation of triggering an interaction panel display control in the living streaming page. The voting control may be a control for instructing the electronic device to display the voting panel. The questioning control may be a control for instructing the electronic device to display the questioning panel.

During the live streaming, the live screen and the interaction panel display control can be displayed in the live streaming page. Therefore, users can view the live screen in the live streaming page, and trigger the interaction panel display control displayed in the live streaming page when intending to interact through the interaction panel. Correspondingly, when detecting that users have triggered the interaction panel display control, the electronic device can determine that the interaction panel display operation is received, display the interaction panel in the live streaming page in response to the interaction panel display operation, and display the voting control 40 and the questioning control 41 in the interaction panel, as shown in FIG. 4.

In S202, in response to a voting control triggering operation, a voting panel is displayed, a first voting initiating control is displayed in the voting panel, and S204 is performed. The first voting initiating control is used for the streamer to perform a voting initiating operation.

The first voting initiating control is used for the streamer to perform the voting initiating operation, that is, the voting initiating operation may include an operation of triggering the first voting initiating control, and correspondingly, the streamer can initiate voting during the live streaming by triggering the first voting initiating control. The first voting initiating control can be displayed in the voting panel.

Figure 4:
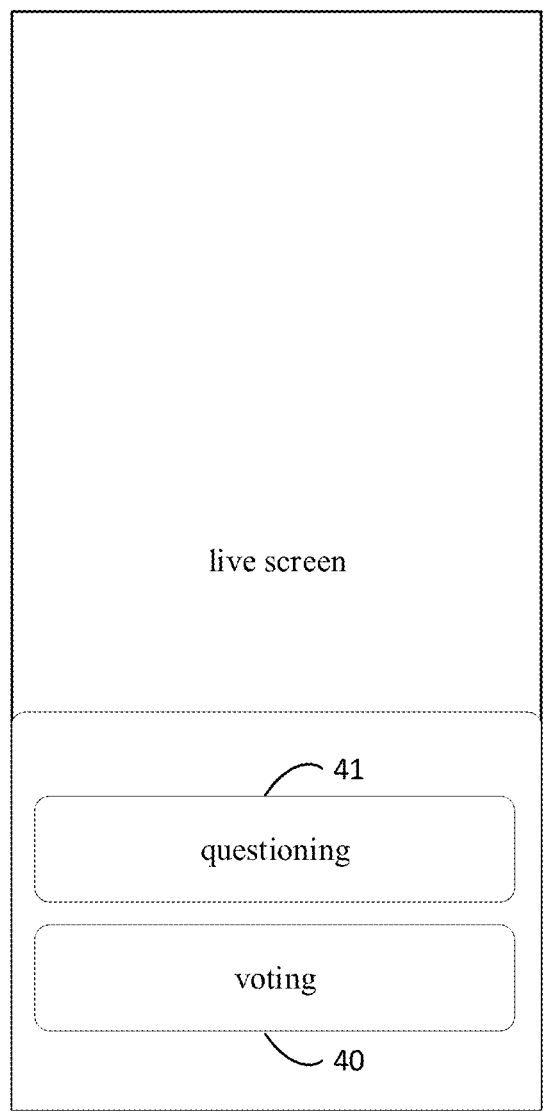
FIG. 4 is a diagram of an interaction panel according to embodiments of the present disclosure.

As shown in FIG. 4, the electronic device displays the voting control 40 in the interaction panel. Therefore, the streamer can trigger the voting control 40 when intending to initiate voting. Correspondingly, when detecting that users have triggered the voting control 40 in the interaction panel, the electronic device can display the voting panel, and display the first voting initiating control 50 in the voting panel, and can also display prompt information in the voting panel to inform the streamer by using the prompt information to introduce the voting information through voice broadcasting, as shown in FIG. 5.

Figure 5:
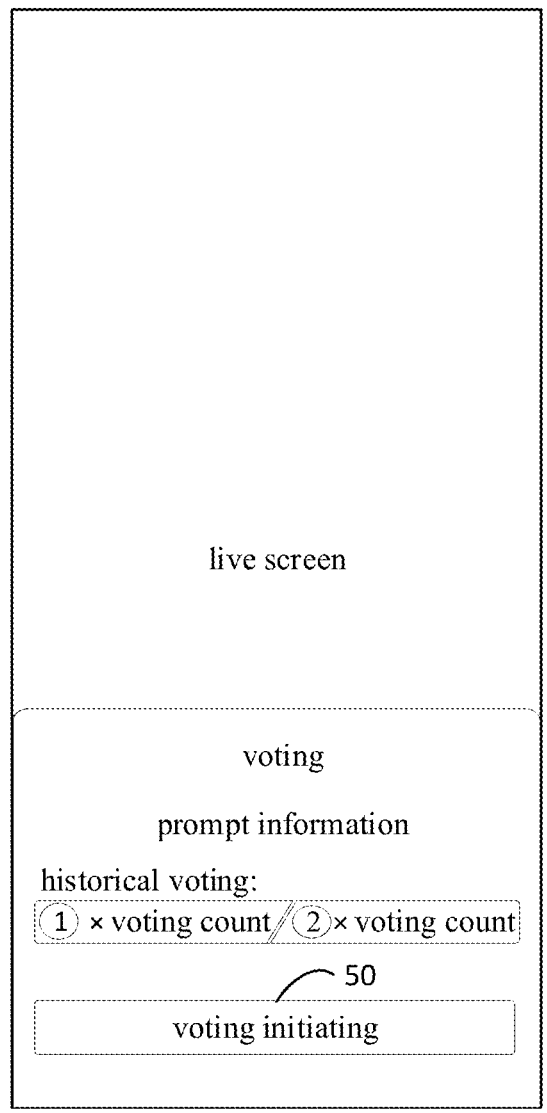
FIG. 5 is a diagram of a voting panel according to embodiments of the present disclosure.

Please continue to refer to FIG. 5. If there are previous concluded voting in the live session, the voting panel can show voting results of historical voting, including voting counts corresponding to a plurality of voting options, respectively.

In the embodiments, the first voting initiating control can be displayed directly in the voting panel, irrespective of whether there are any ongoing but unfinished voting in the live session. It is also possible to consider whether there are ongoing but unfinished voting in this live session, and only display the first voting initiating control in the voting panel if there are no ongoing but unfinished voting in this live session. In this case, optionally, the step of displaying the first voting initiating control in the voting panel includes: in a case where no unfinished voting exists, displaying the first voting initiating control in the voting panel. The live voting method provided by the embodiments further includes: in a case where unfinished voting exist, displaying a voting ending control in the voting panel, the voting ending control is used for the streamer to perform a voting ending operation on the unfinished voting; and in response to the voting ending operation applied to the voting ending control, ending the unfinished voting and displaying the first voting initiating control in the voting panel.

Figure 6:
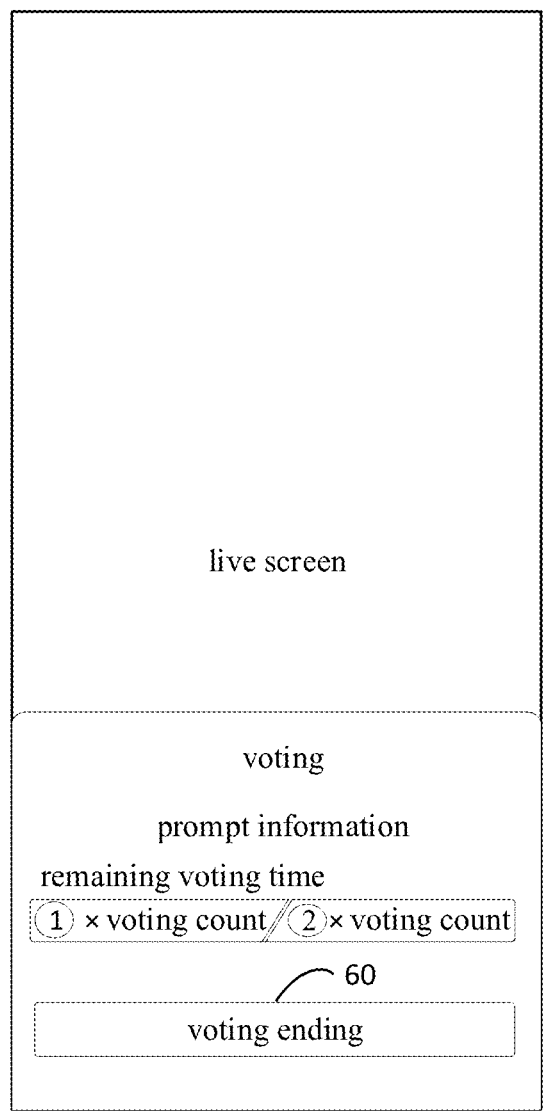
FIG. 6 is diagram of another voting panel according to embodiments of the present disclosure.

For example, when a trigger operation for the voting control displayed in the interaction panel is received, whether there is unfinished voting at the current moment is determined. If there are unfinished voting at the current moment, the voting panel is displayed, and the voting ending control 60 is displayed in the voting panel. Voting counts corresponding to a plurality of voting options of the unfinished voting at the current moment and the remaining voting time of the unfinished voting can also be displayed in the interaction panel, as shown in FIG. 6. When there is no unfinished voting at the current moment, the voting panel is displayed, and the first voting initiating control 50 is displayed in the voting panel, as shown in FIG. 5.

When intending to end the unfinished voting, the streamer can trigger the voting ending control 60 displayed in the voting panel. Correspondingly, when detecting that the streamer has triggered the voting ending control 60 displayed in the voting panel, the electronic device can end the unfinished voting, and display a voting result of the voting and the first voting initiating control 50 in the voting panel, as shown in FIG. 5.

When intending to initiate a new voting, the streamer can trigger the first voting initiating control 50 displayed in the voting panel. Correspondingly, when detecting that the streamer has triggered the first voting initiating control 50 displayed in the voting panel, the electronic device can determine that the voting initiating operation is received and perform S205.

In addition, when there is unfinished voting, a voting in-progress indicator can be displayed at a display position associated with the voting control in the interaction panel, so as to inform the streamer that there is unfinished voting at the current moment.

In S203, in response to an interaction panel display operation applied to the live streaming page, an interaction panel is displayed, and S204 or S208 is performed. A second voting initiating control and a questioning control are displayed in the interaction panel, and the second voting initiating control is used for the streamer to perform the voting initiating operation.

The second voting initiating control may be the voting initiating control displayed in the interaction panel, and the second voting initiating control can be used to instruct the electronic device to initiate new voting.

In the embodiments, the voting initiating control can also be directly displayed in the interaction panel. During the live streaming, the live screen and the interaction panel display control can be displayed in the live streaming page. Therefore, users can view the live screen in the live streaming page, and trigger the interaction panel display control displayed in the live streaming page when intending to interact through the interaction panel. Correspondingly, when detecting that users have triggered the interaction panel display control, the electronic device can determine that the interaction panel display operation is received, display the interaction panel in the live streaming page in response to the interaction panel display operation, and display the second voting initiating control 42 and the questioning control 41 in the interaction panel, as shown in FIG. 7. In this way, the streamer can instruct the electronic device to initiate a new voting by triggering the second voting initiating control 42.

In S204, the voting initiating operation is received.

In S205, in response to the voting initiating operation, a target voting is initiated during the live streaming, and a voting result region of the target voting is displayed in the live streaming page, the voting result region displays voting option identifiers corresponding to the plurality of voting options and voting counts corresponding to the plurality of voting options, voting information of the target voting is voting information broadcasted by the streamer through voice broadcasting during the live streaming, and the voting information contains a voting subject and voting contents corresponding to the plurality of voting options.

In S206, sizes of display regions occupied by the plurality of voting option identifiers in the voting result region are updated based on changes in the voting counts corresponding to the plurality of voting options.

In the embodiments, in the voting process, the sizes of the display regions occupied by the voting option identifiers corresponding to the plurality of voting options in the voting result region can be dynamically adjusted according to the voting counts corresponding to the plurality of voting options, so that the streamer can quickly and visually determine the relative magnitudes of the voting counts corresponding to the plurality of voting options.

The proportions of the sizes of the display regions occupied by the plurality of voting option identifiers in the voting result region can be adjusted according to the proportions of the voting counts corresponding to the plurality of voting options. For example, the proportions of the voting counts corresponding to the plurality of voting options are taken as the proportions of the sizes of the display regions where the plurality of voting option identifiers are located, and the sizes of the display regions occupied by the plurality of voting option identifiers in the voting result region are adjusted according to the proportions of the sizes, for example, lengths of the display regions occupied by the plurality of voting option identifiers in the voting result region are adjusted according to the proportions of the sizes.

In S207, the target voting is ended when a preset ending condition is met, a display state of at least one voting option identifier displayed in the voting result region is adjusted, and the operation is ended.

The preset ending condition can be a condition for ending the target voting, which can be set as required. For example, the preset ending condition includes at least one of the following facts: a voting ending operation for the target voting is received, the voting duration of the target voting reaches a preset duration, or all users in the live streaming have finished voting. The preset duration can be preset by the streamer or the developer before initiating the live streaming.

For example, after the target voting is initiated, the electronic device can periodically detect whether the current condition meets the preset ending condition, end the target voting in a case that it is detected that the current condition meets the preset ending condition, and adjust the display state of the at least one voting option identifier displayed in the voting result region, such as adjusting a display style of the at least one voting option identifier displayed in the voting result region, so as to inform the streamer that the target voting is ended.

In one implementation, the step of adjusting the display state of the at least one voting option identifier displayed in the voting result region includes: adjusting a display state of a first voting option identifier displayed in the voting result region from a first original display state to a first target display state, a voting option corresponding to the first voting option identifier is a voting option corresponding to a voting count that meets the preset condition; and/or adjusting a display state of a second voting option identifier displayed in the voting result region from a second original display state to a second target display state, a voting option corresponding to the second voting option identifier is a voting option corresponding to a voting count that does not meet the preset condition.

The preset condition can be flexibly set as required. For example, the preset condition may be that the voting count ranks in the top n (where n is a positive integer less than the total number of voting options for the target voting), or the preset condition may be that the voting count is greater than or equal to a preset quantity threshold, or the like, which is not limited by the embodiments. Correspondingly, the first voting option identifier is a voting option identifier of a voting option that meets the preset condition in the target voting, and the second voting option identifiers are other voting option identifiers than the first voting option identifier in the voting result region.

Assuming that n is 1, which means taking the maximum voting count as the preset condition, when the preset ending condition is met, the electronic device can end the target voting and adjust the display state of the first voting option identifier corresponding to the voting option with the maximum voting count in the voting result region from the first original display state to the first target display state, such as changing a display brightness of the first voting option identifier in the voting result region from an original display brightness to a first target display brightness; and/or adjust other voting option identifiers than the first voting option identifier in the voting result region from the second original display state to the second target display state, such as changing a display brightness of the second voting option identifiers in the voting result region from an original display brightness to a second target display brightness, and adjust the color of the second voting option identifier to gray.

In S208, in response to a questioning control triggering operation, a questioning panel is displayed, and question information sent by users to the streamer are displayed in the questioning panel.

As shown in FIG. 4 and FIG. 7, the electronic device displays the questioning control 41 in the interaction panel. Therefore, the streamer can trigger the questioning control 41 displayed in the interaction panel when intending to view the question information sent by users. Correspondingly, when detecting that the streamer has triggered the questioning control 41, the electronic device can display the questioning panel in the live streaming page, and display the question information sent by users to the streamer in the questioning panel, so as to answer the question information. The questioning panel can display first question information that the streamer has answered, second question information that the streamer is answering and/or third question information that the streamer has not answered yet, and the first question information, the second question information and the third question information may have different display states in the questioning panel, so that the streamer can quickly distinguish them.

When there is unanswered question information, the number of the unanswered question information can be displayed at a display position associated with the questioning control in the interaction panel, serving as a reminder for the streamer.

According to the live voting method provided by the embodiments, the streamer can easily initiate voting, the operation required for the streamer to initiate the voting is simplified, and disruption to live streaming is minimized. In addition, the voting result is displayed in the form of voting option identifiers, so that obstruction to the live screen can be reduced. Further, the voting option identifiers corresponding to the voting options with different voting counts can be displayed in different display states and/or in display regions with different sizes, which can provide convenience for the streamer to determine the relative magnitudes of the voting counts corresponding to the plurality of voting options, thus improving the live streaming experience for the streamer.

FIG. 8 is a flowchart of a live voting method according to embodiments of the present disclosure. The method can be performed by a live voting apparatus. The apparatus can be realized by software and/or hardware, and can be configured in an electronic device, a mobile phone or a tablet computer. The live voting method provided by the embodiment of the present disclosure is applicable for scenarios where users participate in a voting during the live streaming. As shown in FIG. 8, the live voting method provided by the embodiments may include the following steps.

In S301, a voting result region and a voting input region of the target voting are displayed in a live streaming page, voting option identifiers corresponding to a plurality of voting options and voting counts corresponding to the plurality of voting options are displayed in the voting result region, and voting option controls corresponding to the plurality of voting options are displayed in the voting input region.

The target voting can be a voting initiated by the streamer during the live streaming, that is, an ongoing voting, or the target voting can be a voting preset by developers, that is, the preset voting. The preset voting may contain voting option identifiers corresponding to a plurality of voting options, and there is no preset voting subject and voting content. Each voting option identifier may be a preset voting option identifier irrelevant to the voting content of a voting option corresponding to the voting option identifier. For example, different voting option identifiers may be different numbers, different expressions or other different characters. Different voting option identifiers can correspond to different voting options. The voting content corresponding to a voting option may be the option content actually corresponding to the voting option. The voting result region of the target voting may display the voting option identifiers corresponding to the plurality of voting options of the target voting and the voting counts (i.e. the number of voters) corresponding to the plurality of voting options. The voting option control corresponding to each voting option has the voting option identifier corresponding to the voting option, and the corresponding voting option identifier can be displayed on the voting option control. In embodiments, the voting input region is displayed first, and the voting result region is displayed upon completing the voting process in the voting input region.

Figure 9:
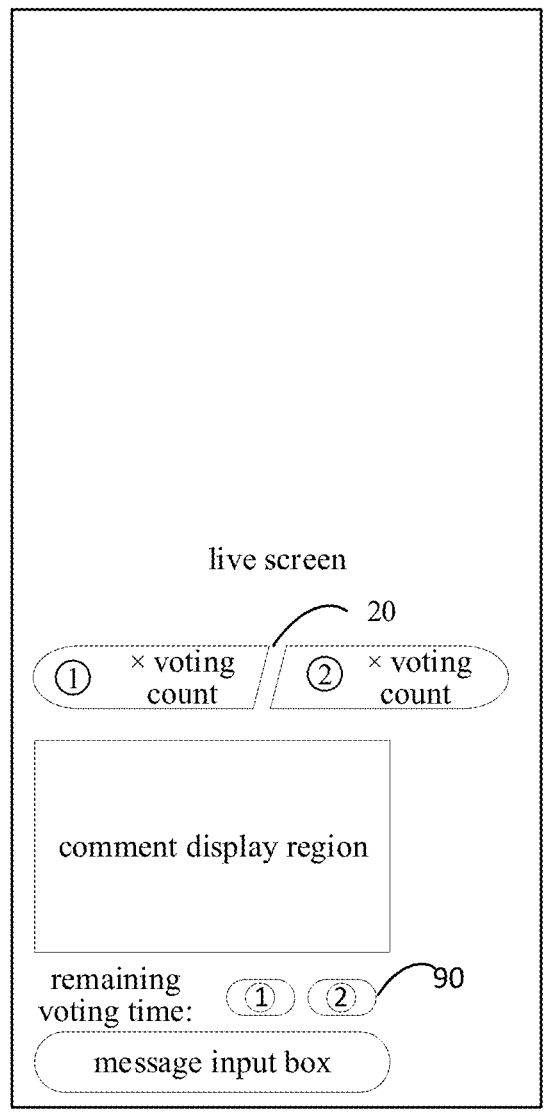
FIG. 9 is a diagram of a live streaming page on a user side according to embodiments of the present disclosure.

The voting result region can be displayed on one side of the comment display region, and the voting input region can be displayed on the other side of the comment display region. For example, the voting result region can be located above the comment display region, while the voting input region can be displayed below the comment display region. The voting result display region and the voting input region can be controlled separately for display. For example, after a voting input operation is triggered in the voting input region, the display of the voting input region can be stopped, while the voting result region can be continuously displayed for a preset period of time, so that users can continue to obtain voting result information and learn about the voting progress, and the occupation of a comment section can also be avoided. That is, it enables independent control over the display of the voting result region and the voting input region, without the need for simultaneous display. As shown in FIG. 9, when the streamer initiates a target voting, the electronic device can display the voting result region 20 and the voting input region 90 of the target voting in the live streaming page on a user side, for example, the voting result region 20 of the target voting can be displayed above the comment display region of the live streaming page, and the voting input region 90 of the target voting can be displayed below the comment display region of the live streaming page. The voting input region 90 is displayed between the comment display region of the live streaming page and a message input box displayed in the live streaming page, and comments sent by the streamer and/or users during the live streaming are displayed in the comment display region of the live streaming page. The comments may include comments input and sent by users in the message input box, and comments sent by users by triggering the corresponding voting option control in the voting input region. Voting option controls corresponding to the plurality of voting options are displayed in the voting input region, and the remaining voting time of the target voting can also be displayed. In FIG. 9, voting option identifiers are displayed in the voting input region 90 and the voting result region 20, that is, identifiers 1 and 2 in the figure. The voting option identifiers in the voting input region 90 correspond to the voting option identifiers in the voting result region 20. The voting result region 20 above shows identifiers 1 and 2, and the voting input region 90 below also shows identifiers 1 and 2. In this way, it is not necessary to directly display complicated voting option descriptions (that is, contents indicated by each voting option, voting type, voting subject, etc.), and thus, by providing explanations through voice broadcasting by the streamer, the occupation of the comment section can be reduced. In contrast to providing textual descriptions for the voting options, the method avoids potential misinterpretations among users. In the present application, by displaying the voting option identifiers in the voting input region and the voting result region, users can understand the voting options without any ambiguity by using the voting option identifiers. Additionally, relevant instructions for voting options can be obtained by combining the voice information broadcast by the streamer during the live broadcast, which can further avoid user misunderstandings, improve the user experience, and be more consistent with the user's understanding of voting.

Since the streamer broadcasts the voting information of the target voting through voice broadcasting, only the voting option identifiers of the plurality of voting options are displayed during the live streaming in the embodiments, and there is no need to display the voting subject and the voting contents corresponding to the plurality of voting options in the live streaming page in the form of pop-ups or the like, so as to reduce the obstruction to the live screen during voting, and provide convenience for users to view the live screen.

In S302, in response to a trigger operation for any voting option control, a voting is initiated for a target voting option corresponding to the voting option control on which the trigger operation is performed, and a comment corresponding to the target voting option is sent.

The voting option control can be triggered by users, so as to initiate the voting for the corresponding voting option. Correspondingly, the target voting option is a voting option corresponding to the voting option control triggered by users. The target voting can be a voting initiated by the streamer during the live streaming. The target voting option is an option corresponding to the voting initiated by the streamer. For example, the target voting can be "Do you like milk tea?", and there may be two target voting options, namely "like" and "not like".

As shown in FIG. 9, the electronic device displays the voting result region 20 and the voting input region 90 of the target voting in the live streaming page. When users intend to select a voting option of the target voting, that is, when users initiate the voting for a voting option of the target voting, the voting option control corresponding to the voting option displayed in the voting input region 90 can be triggered. Correspondingly, when detecting that users have triggered a voting option control displayed in the voting input region 90, the electronic device can increase the voting count of the voting option corresponding to the voting option control by one, send and display a comment corresponding to the voting option in the comment display region.

In the embodiments, the voting subject of the target voting and/or the voting contents of the plurality of voting options can be communicated to users by the streamer through voice broadcasting. Users can perform a trigger operation for a voting option control according to the voice broadcast information from the streamer. In this case, the step of, in response to a trigger operation for any voting option control, initiating voting for a target voting option corresponding to the voting option control on which the trigger operation is performed, and sending a comment corresponding to the target voting option, includes: in response to the trigger operation by users based on target voice broadcast information, initiating the voting for the target voting option corresponding to the voting option control on which the trigger operation is performed, and sending the comment corresponding to the target voting option. The target voice broadcast information is voice broadcast information corresponding to the target voting provided by a streamer terminal of the live streaming, and the voice broadcast information contains voting contents corresponding to the plurality of voting options, respectively.

In one implementation, after initiating the voting for the target voting option corresponding to the voting option control on which the trigger operation is performed, the method further includes: adjusting a display state of a target voting option identifier in the voting result region, the target voting option identifier is a voting option identifier corresponding to the target voting option; and/or adjusting display states of other voting option identifiers than the target voting option identifier among the plurality of voting option identifiers in the voting result region.

In the above implementation, after users initiate voting for a voting option, the voting option identifier corresponding to the voting option selected by users and the voting option identifiers corresponding to the voting options not selected by users can be displayed as different display states. For example, after users initiate voting for a target voting option, the transparency of the voting option identifier corresponding to the target voting option displayed in the voting result region may be reduced, and/or the transparency of other voting option identifiers displayed in the voting result region than the voting option identifier corresponding to the target voting option may be increased, in order to allow users to clearly identify the selected voting option.

According to the live voting method provided by the embodiments, a voting result region and a voting input region of the target voting are displayed in a live streaming page, voting option identifiers corresponding to a plurality of voting options and voting counts corresponding to the plurality of voting options are displayed in the voting result region, and voting option controls corresponding to the plurality of voting options are displayed in the voting input region; and in response to a trigger operation for any voting option control, voting is initiated for a target voting option corresponding to the voting option control on which the trigger operation is performed, and a comment corresponding to the target voting option is sent. By utilizing the above described technical scheme and triggering the voting option control to initiate voting, the embodiments can simplify the operations required for users to initiate voting and improve voting experience of users during the live streaming. Furthermore, by displaying the voting option identifiers in the voting result region and displaying the voting option controls in the voting input region, user operations are facilitated, and flexible adjustment of the voting option identifiers and the voting option controls is realized.

Figure 10:
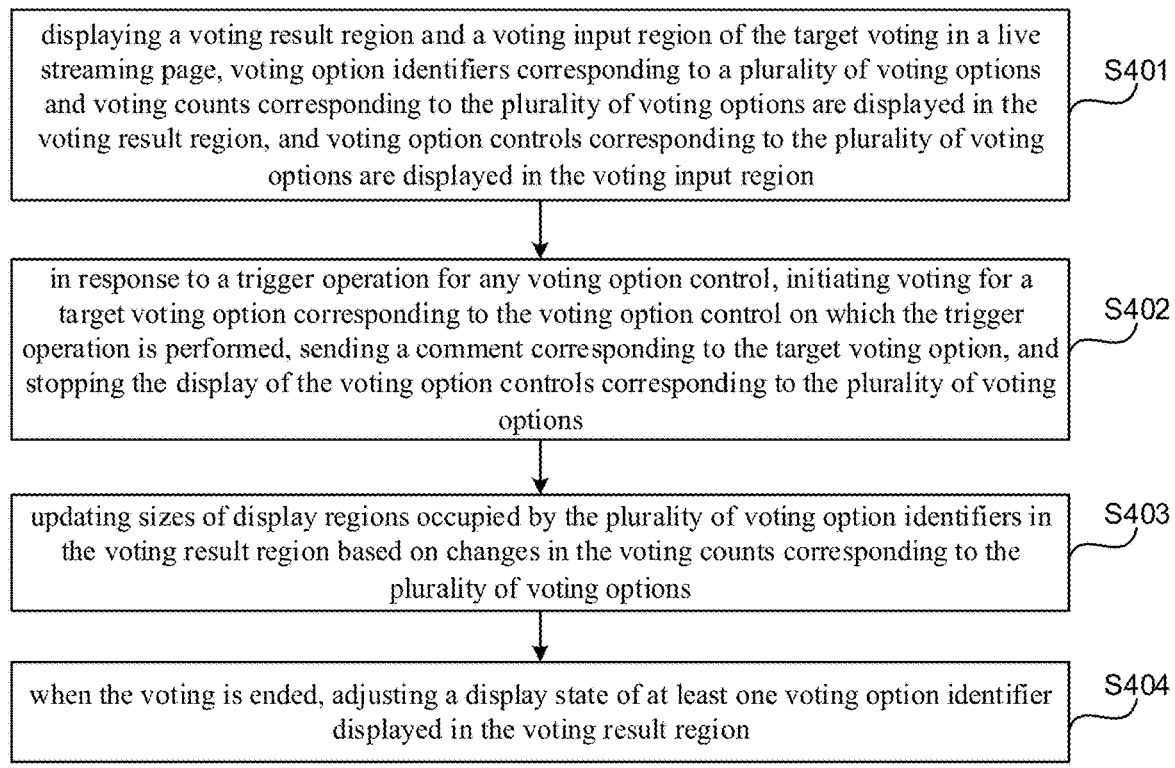
FIG. 10 is a flowchart of still another live voting method according to embodiments of the present disclosure.

FIG. 10 is a flowchart of still another live voting method according to embodiments of the present disclosure. The scheme in the embodiments can be combined with one or more alternative schemes in the above embodiment. Optionally, after initiating the voting for the target voting option corresponding to the voting option control on which the trigger operation is performed, the method further includes: stopping displaying the voting option controls corresponding to the plurality of voting options, respectively.

Optionally, after displaying the voting result region and the voting input region of the target voting in the live streaming page, the method further includes: updating sizes of display regions occupied by the plurality of voting option identifiers in the voting result region based on changes in the voting counts corresponding to the plurality of voting options.

Optionally, when the voting is ended, a display state of at least one voting option identifier displayed in the voting result region is adjusted.

As shown in FIG. 10, the live voting method provided by the embodiments may include the following steps.

In S401, a voting result region and a voting input region of the target voting are displayed in a live streaming page, voting option identifiers corresponding to a plurality of voting options and voting counts corresponding to the plurality of voting options are displayed in the voting result region, and voting option controls corresponding to the plurality of voting options are displayed in the voting input region.

In S402, in response to a trigger operation for any voting option control, voting is initiated for a target voting option corresponding to the voting option control on which the trigger operation is performed, a comment corresponding to the target voting option is sent, and the display of the voting option controls corresponding to the plurality of voting options is stopped.

In the embodiments, after users finish voting, the display of the voting option controls corresponding to the plurality of voting options can be stopped, so as to reduce the obstruction to the live screen and avoid the situation that users vote multiple times. In the present application, after current users (the users that are currently watching the live stream using a live streaming client) finish voting or the voting is ended, the display of the voting option controls can be stopped on a live streaming interface of the client, the voting option identifiers and the voting counts can be continuously displayed in the voting result region for a preset period of time, and the display of the voting option identifiers and the voting counts in the voting result region can be stopped after the preset period of time. Here, the preset period of time can be set as required.

In S403, sizes of display regions occupied by the plurality of voting option identifiers in the voting result region are updated based on changes in the voting counts corresponding to the plurality of voting options.

In the embodiments, in the voting process, the sizes of the display regions occupied by the voting option identifiers corresponding to the plurality of voting options in the voting result region can be dynamically adjusted according to the voting counts corresponding to the plurality of voting options, so that users can quickly and visually determine the relative magnitudes of the voting counts corresponding to the plurality of voting options.

The proportions of the sizes of the display regions occupied by the plurality of voting option identifiers in the voting result region can be adjusted according to the proportions of the voting counts corresponding to the plurality of voting options. For example, the proportions of the voting counts corresponding to the plurality of voting options are taken as the proportions of the sizes of the display regions where the plurality of voting option identifiers are located, and the sizes of the display regions occupied by the plurality of voting option identifiers in the voting result region are adjusted according to the proportions of the sizes, for example, lengths of the display regions occupied by the plurality of voting option identifiers in the voting result region are adjusted according to the proportions of the sizes.

In S404, when the voting is ended, a display state of at least one voting option identifier displayed in the voting result region is adjusted.

For example, when the voting is ended, that is, when the voting result of the target voting has been generated, the display state of at least one voting option identifier displayed in the voting result region can be adjusted, such as adjusting a display style of at least one voting option identifier displayed in the voting result region, so as to inform users that the target voting has ended.

In one implementation, the step of adjusting the display state of the at least one voting option identifier displayed in the voting result region includes: adjusting a display state of a first voting option identifier displayed in the voting result region from a first original display state to a first target display state, a voting option corresponding to the first voting option identifier is a voting option corresponding to a voting count that meets the preset condition; and/or adjusting a display state of a second voting option identifier displayed in the voting result region from a second original display state to a second target display state, a voting option corresponding to the second voting option identifier is a voting option corresponding to a voting count that does not meet the preset condition.

The preset condition can be flexibly set as required. For example, the preset condition may be that the voting count ranks in the top n (where n is a positive integer less than the total number of voting options for the target voting), or the preset condition may be that the voting count is greater than or equal to a preset quantity threshold, or the like, which is not limited by the embodiments. Correspondingly, the first voting option identifier is a voting option identifier of a voting option that meets the preset condition in the target voting, and the second voting option identifiers are other voting option identifiers than the first voting option identifier in the voting result region.

Assuming that n is 1, which means taking the maximum voting count as the preset condition, when the preset ending condition is met, the electronic device can end the target voting and adjust the display state of the first voting option identifier corresponding to the voting option with the maximum voting count in the voting result region from the first original display state to the first target display state, such as changing a display brightness of the first voting option identifier in the voting result region from an original display brightness to a first target display brightness; and/or adjust other voting option identifiers than the first voting option identifier in the voting result region from the second original display state to the second target display state, such as changing a display brightness of the second voting option identifiers in the voting result region from an original display brightness to a second target display brightness, and adjust the color of the second voting option identifier to gray.

In addition, after adjusting the display states of the voting option identifiers displayed in the voting result region, the plurality of voting option identifiers and the voting counts corresponding to the voting options associated with the voting option identifiers can be continuously displayed in the voting result region for a set period of time, and after the set period of time, the display of the plurality of voting option identifiers and the voting counts corresponding to the voting options associated with the voting option identifiers can be stopped, so as to facilitate users to view the live screen.

According to the live voting method provided by the embodiments, different display states are adopted and/or the voting option identifiers corresponding to voting options with different voting counts are displayed in display regions with different sizes, which not only provides convenience for users to determine the relative magnitudes of the voting counts corresponding to the plurality of voting options, thus improving the live stream viewing experience for users, but also has good universality, making it widely applicable to various voting scenarios, ensuring user-friendliness and improving user understanding, ultimately elevating the voting experience of users.

Figure 11:
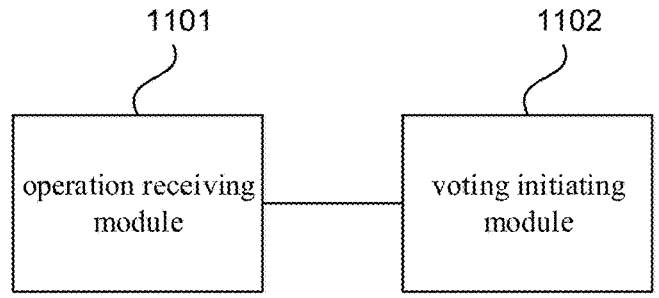
FIG. 11 is a structural block diagram of a live voting apparatus according to embodiments of the present disclosure.

FIG. 11 is a structural block diagram of a live voting apparatus according to embodiments of the present disclosure. The apparatus can be realized by software and/or hardware, and can be configured in an electronic device, a mobile phone or a tablet computer. When using the apparatus, voting can be initiated by executing the live voting method. As shown in FIG. 11, the live voting apparatus provided by the embodiments may include an operation receiving module 1101 and a voting initiating module 1102.

The operation receiving module 1101 is configured to receive a voting initiating operation; and the voting initiating module 1102 is configured to, in response to the voting initiating operation, initiate a target voting during the live streaming, and display a voting result region of the target voting in a live streaming page, the voting result region displays voting option identifiers corresponding to a plurality of voting options and voting counts corresponding to the plurality of voting options, voting information of the target voting is voting information broadcasted by the streamer through voice broadcasting during the live streaming, and the voting information contains a voting subject and voting contents corresponding to the plurality of voting options.

According to the live voting apparatus provided by the embodiments, first, a voting initiating operation is received by the operation receiving module; and then, in response to the voting initiating operation, the voting initiating module initiates a target voting during the live streaming, and displays a voting result region of the target voting in a live streaming page, the voting result region displays voting option identifiers corresponding to a plurality of voting options and voting counts corresponding to the plurality of voting options, voting information of the target voting is voting information broadcasted by the streamer through voice broadcasting during the live streaming, and the voting information contains a voting subject and voting contents corresponding to the plurality of voting options. By adopting the above technical scheme, when the voting initiating operation is received, the preset voting is directly initiated, and the streamer broadcasts the voting information of the initiated preset voting through voice broadcasting during the live streaming, without the need for manual input of the voting information. Therefore, the operation required for the streamer to initiate voting can be simplified, and the disruption to live streaming is minimized.

The live voting apparatus provided by the embodiments may further include a size adjustment module, configured to, after the voting result region of the target voting is displayed in the live streaming page, update sizes of display regions occupied by the plurality of voting option identifiers in the voting result region based on changes in the voting counts corresponding to the plurality of voting options.

The live voting apparatus provided by the embodiments may further include a voting ending module, that is configured to, end the target voting when a preset ending condition is met, and adjust a display state of at least one voting option identifier displayed in the voting result region.

In the above scheme, the voting ending module can be configured to: adjust the display state of a first voting option identifier displayed in the voting result region from a first original display state to a first target display state, a voting option corresponding to the first voting option identifier is a voting option corresponding to a voting count that meets the preset condition; and/or adjust the display state of a second voting option identifier displayed in the voting result region from a second original display state to a second target display state, a voting option corresponding to the second voting option identifier is a voting option corresponding to a voting count that does not meet the preset condition.

In the above scheme, the preset ending condition may include at least one selected of the following: a voting ending operation for the target voting is received, the voting duration of the target voting reaches a preset duration, or all users have finished voting.

The live voting apparatus provided by the embodiments may further include a first interaction panel display module, that is configured to, before the voting initiating operation is received, in response to an interaction panel display operation applied to the live streaming page, display an interaction panel, voting controls is displayed in the interaction panel; and a first voting panel display module, that is configured to, in response to a voting control triggering operation, display a voting panel, and display a first voting initiating control in the voting panel, the first voting initiating control is used for the streamer to perform the voting initiating operation.

In the above scheme, the first voting panel display module can be configured to: display a first voting initiating control in the voting panel if there are no unfinished voting. The live voting apparatus provided by the embodiments may further include a second voting panel display module, that is configured to, in a case where unfinished voting exist, display a voting ending control in the voting panel, the voting ending control is used for the streamer to perform a voting ending operation on the unfinished voting; and a control display module, that is configured to, in response to the voting ending operation applied to the voting ending control, end the unfinished voting and display the first voting initiating control in the voting panel.

The live voting apparatus provided by the embodiments may further include a second interaction panel display module, that is configured to, before the voting initiating operation is received, in response to an interaction panel display operation applied to the live streaming page, display an interaction panel, a second voting initiating control is displayed in the interaction panel, and the second voting initiating control is used for the streamer to perform the voting initiating operation.

In the above scheme, a questioning control can be displayed in the interaction panel. The live voting apparatus provided by the embodiments may further include a questioning panel display module, that is configured to, in response to a questioning control triggering operation, display a questioning panel, and display question information sent by users to the streamer in the questioning panel.

The live voting apparatus provided by the embodiments can perform the live voting method provided by any embodiment of the present disclosure, and has corresponding functional modules for executing the live voting method and relevant effects. For technical details not described in the embodiments, please refer to the live voting method provided by any embodiment of the present disclosure.

Figure 12:
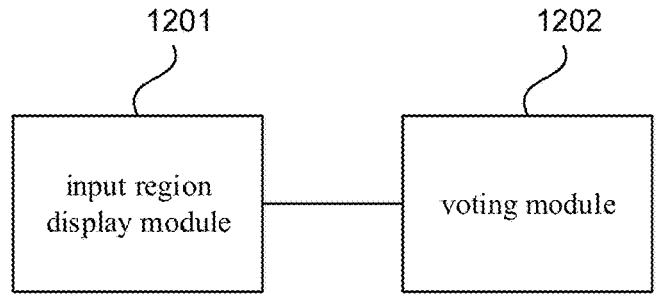
FIG. 12 is a structural block diagram of another live voting apparatus according to embodiments of the present disclosure.

FIG. 12 is a structural block diagram of a live voting apparatus according to embodiments of the present disclosure. The apparatus can be realized by software and/or hardware, and can be configured in an electronic device, or typically, configured in a mobile phone or a tablet computer. When using the apparatus, voting can be initiated by executing the live voting method. As shown in FIG. 12, the live voting apparatus provided by the embodiments may include an input region display module 1201 and a voting module 1202.

The input region display module 1201 is configured to display a voting result region and a voting input region of the target voting in a live streaming page, voting option identifiers corresponding to a plurality of voting options and voting counts corresponding to the plurality of voting options are displayed in the voting result region, and voting option controls corresponding to the plurality of voting options are displayed in the voting input region; and the voting module 1202 is configured to, in response to a trigger operation for any voting option control, initiate voting for a target voting option corresponding to the voting option control on which the trigger operation is performed, and send a comment corresponding to the target voting option.

According to the live voting apparatus provided by the embodiments, a voting result region and a voting input region of the target voting are displayed in a live streaming page by the input region display module, the voting result region displays voting option identifiers corresponding to a plurality of voting options and voting counts corresponding to the plurality of voting options, and voting option controls corresponding to the plurality of voting options are displayed in the voting input region; and in response to a trigger operation for any voting option control, the voting module initiates voting for a target voting option corresponding to the voting option control on which the trigger operation is performed, and sends a comment corresponding to the target voting option. By utilizing the above described technical scheme and triggering the voting option control to initiate voting, the embodiments can simplify the operations required for users to initiate voting and improve voting experience of users during the live streaming. Furthermore, by displaying the voting option identifiers in the voting result region and displaying the voting option controls in the voting input region, user operations are facilitated, and flexible adjustment of the voting option identifiers and the voting option controls is realized.

In the above scheme, the voting module 1202 can be configured to, in response to the trigger operation by users based on target voice broadcast information, initiate voting for the target voting option corresponding to the voting option control on which the trigger operation is performed, and send the comment corresponding to the target voting option. The target voice broadcast information is voice broadcast information corresponding to the target voting option provided by the streamer terminal of the live streaming, and the voice broadcast information contains voting contents corresponding to the plurality of voting options, respectively.

The live voting apparatus provided by the embodiments may further include a first state adjustment module, that is configured to, after a voting is initiated for the target voting option corresponding to the voting option control on which the trigger operation is performed, adjust a display state of a target voting option identifier in the voting result region, the target voting option identifier is a voting option identifier corresponding to the target voting option; and/or adjust display states of other voting option identifiers than the target voting option identifier among the plurality of voting option identifiers in the voting result region.

The live voting apparatus provided by the embodiments may further include a display stopping module, that is configured to, after the voting is initiated for the target voting option corresponding to the voting option control on which the trigger operation is performed, stop displaying the voting option controls corresponding to the plurality of voting options, respectively.

The live voting apparatus provided by the embodiments may further include a size updating module, that is configured to, after the voting result region and the voting input region of the target voting are displayed in the live streaming page, update sizes of display regions occupied by the plurality of voting option identifiers in the voting result region based on changes in the voting counts corresponding to the plurality of voting options.

The live voting apparatus provided by the embodiments may further include a second state adjustment module, that is configured to, when the voting is ended, adjust a display state of at least one voting option identifier displayed in the voting result region.

In the above scheme, the second state adjustment module can be configured to: adjust a display state of a first voting option identifier displayed in the voting result region from a first original display state to a first target display state, a voting option corresponding to the first voting option identifier is a voting option corresponding to a voting count that meets the preset condition; and/or adjust a display state of a second voting option identifier displayed in the voting result region from a second original display state to a second target display state, a voting option corresponding to the second voting option identifier is a voting option corresponding to a voting count that does not meet the preset condition.

The live voting apparatus provided by the embodiments can perform the live voting method provided by any embodiment of the present disclosure, and has corresponding functional modules for executing the live voting method and relevant effects. For technical details not described in the embodiments, please refer to the live voting method provided by any embodiment of the present disclosure.

Figure 13:
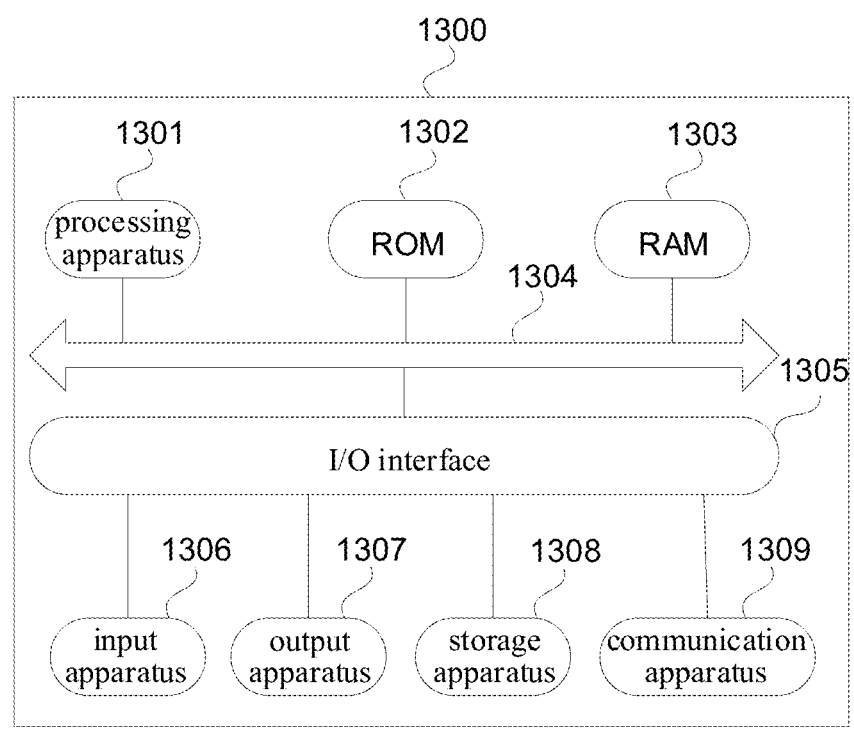
FIG. 13 is a structural diagram of an electronic device according to embodiments of the present disclosure.

Referring to FIG. 13, it is a structural diagram of an electronic device (for example, a terminal device) 1300 suitable for implementing the embodiments of the present disclosure. The terminal device in the embodiments of the present disclosure may include mobile terminals such as mobile phones, notebook computers, digital broadcast receivers, personal digital assistants (PDA), portable android devices (PAD), portable multimedia players (PMP), and vehicle-mounted terminals (such as vehicle-mounted navigation terminals), and fixed terminals such as digital television (TV) and desktop computers. The electronic device shown in FIG. 13 is only an example, and should not impose any limitations on the functionality and scope of use of the embodiments of the present disclosure.

As shown in FIG. 13, the electronic device 1300 may include a processing apparatus (such as a central processing unit, and a graphics processor) 1301, it may execute various appropriate actions and processes according to a program stored in a read-only memory (ROM) 1302 or a program loaded from a storage apparatus 1308 to a random access memory (RAM) 1303. In RAM 1303, various programs and data required for operations of the electronic device 1300 are also stored. The processing apparatus 1301, ROM 1302, and RAM 1303 are connected to each other by a bus 1304. An input/output (I/O) interface 1305 is also connected to the bus 1304.

The following apparatuses may be connected to the I/O interface 1305: an input apparatus 1306 such as a touch screen, a touchpad, a keyboard, a mouse, a camera, a microphone, an accelerometer, and a gyroscope; an output apparatus 1307 such as a liquid crystal display (LCD), a loudspeaker, and a vibrator; a storage apparatus 1308 such as a magnetic tape, and a hard disk drive; and a communication apparatus 1309. The communication apparatus 1309 may allow the electronic device 1300 to wireless-communicate or wire-communicate with other devices so as to exchange data. Although FIG. 13 shows the electronic device 1300 with various apparatuses, it should be understood that it is not required to implement or possess all the apparatuses shown. Alternatively, it may implement or possess the more or less apparatuses.

According to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 1309, or installed from the storage apparatus 1308, or installed from ROM 1302. When the computer program is executed by the processing apparatus 1301, the above functions defined in the sight line tracking method in the embodiments of the present disclosure are executed.

The above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above. The storage medium can be a non-transitory storage medium.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local region network ("LAN"), a wide region network ("WAN"), an internet work (such as the Internet), and an end-to-end network (such as an ad hoc end-to-end network), as well as any currently known or future-developed networks.

The above-described computer-readable medium may be included in the above-described electronic device, or may also exist alone without being assembled into the electronic device.

The above-described computer-readable medium carries one or more programs, and when the one or more programs are executed by the electronic device, the electronic device is caused to: display a voting result region and a voting input region of a target voting in a live streaming page, voting option identifiers corresponding to a plurality of voting options and voting counts corresponding to the plurality of voting options are displayed in the voting result region, and voting option controls corresponding to the plurality of voting options are displayed in the voting input region; and initiate, in response to a trigger operation for a voting option control, voting for a target voting option corresponding to the voting option control on which the trigger operation is performed, and sending a comment corresponding to the target voting option.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet). The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, Example 1 provides a live voting method, which includes:

displaying a voting result region and a voting input region of a target voting in a live streaming page, voting option identifiers corresponding to a plurality of voting options and voting counts corresponding to the plurality of voting options are displayed in the voting result region, and voting option controls corresponding to the plurality of voting options are displayed in the voting input region; and initiating, in response to a trigger operation for a voting option control, voting for a target voting option corresponding to the voting option control on which the trigger operation is performed, and sending a comment corresponding to the target voting option.

According to one or more embodiments of the present disclosure, Example 2 is a method according to Example 1, initiating, in response to the trigger operation for the voting option control, the voting for the target voting option corresponding to the voting option control on which the trigger operation is performed, and sending the comment corresponding to the target voting option, includes:

in response to the trigger operation by users based on target voice broadcast information, initiating the voting for the target voting option corresponding to the voting option control on which the trigger operation is performed, and sending the comment corresponding to the target voting option, the target voice broadcast information is voice broadcast information corresponding to the target voting provided by a streamer terminal of live streaming, and the voice broadcast information contains voting contents corresponding to the plurality of voting options, respectively.

According to one or more embodiments of the present disclosure, Example 3 is a method according to Example 1, after initiating the voting for the target voting option corresponding to the voting option control on which the trigger operation is performed, which further includes at least one of the following:

adjusting a display state of a target voting option identifier in the voting result region, the target voting option identifier is a voting option identifier corresponding to the target voting option; or adjusting display states of other voting option identifiers than the target voting option identifier among a plurality of voting option identifiers in the voting result region.

According to one or more embodiments of the present disclosure, Example 4 is a method according to Example 1, after initiating the voting for the target voting option corresponding to the voting option control on which the trigger operation is performed, which further includes:

stopping displaying voting option controls corresponding to the plurality of voting options, respectively.

According to one or more embodiments of the present disclosure, Example 5 is a method according to any one of Examples 1-4, after displaying the voting result region and the voting input region of the target voting in the live streaming page, which further includes:

updating sizes of display regions occupied by the plurality of voting option identifiers in the voting result region based on changes in the voting counts corresponding to the plurality of voting options.

According to one or more embodiments of the present disclosure, Example 6 is a method according to any one of Examples 1-4, which further includes:

when the voting is ended, adjusting a display state of at least one voting option identifier displayed in the voting result region.

According to one or more embodiments of the present disclosure, Example 7 is a method according to Example 6, adjusting the display state of the at least one voting option identifier displayed in the voting result region includes at least one of the following:

adjusting a display state of a first voting option identifier displayed in the voting result region from a first original display state to a first target display state, a voting option corresponding to the first voting option identifier is a voting option corresponding to a voting count that meets a preset condition; or adjusting a display state of a second voting option identifier displayed in the voting result region from a second original display state to a second target display state, a voting option corresponding to the second voting option identifier is a voting option corresponding to a voting count that does not meet a preset condition.

According to one or more embodiments of the present disclosure, Example 8 provides a live voting apparatus, which includes:

an input region display module, configured to display a voting result region and a voting input region of a target voting in a live streaming page, voting option identifiers corresponding to a plurality of voting options and voting counts corresponding to the plurality of voting options are displayed in the voting result region, and voting option controls corresponding to the plurality of voting options are displayed in the voting input region; and a voting module, configured to, in response to a trigger operation for a voting option control, initiate voting for a target voting option corresponding to the voting option control on which the trigger operation is performed, and send a comment corresponding to the target voting option.

According to one or more embodiments of the present disclosure, Example 9 provides an electronic device, which includes:

at least one processor; and a memory, configured to store at least one program;

the at least one program, when executed by the at least one processor, cause the at least one processor to implement the live voting method according to any one of Examples 1-7.

According to one or more embodiments of the present disclosure, Example 10 provides a computer-readable storage medium, on which computer program is stored, the computer program, when executed by a processor, implements the live voting method according to any one of Examples 1-7.

According to one or more embodiments of the present disclosure, Example 11 provides a computer program product, the computer program product, when executed by a computer, cause the computer to implement the live voting method according to any one of Examples 1-7.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A live voting method, comprising:

displaying a voting result region and a voting input region of a target voting in a live streaming page, wherein voting option identifiers corresponding to a plurality of voting options and voting counts corresponding to the plurality of voting options are displayed in the voting result region, and voting option controls corresponding to the plurality of voting options are displayed in the voting input region; and initiating, in response to a trigger operation for a voting option control, voting for a target voting option corresponding to the voting option control on which the trigger operation is performed, and sending a comment corresponding to the target voting option;

wherein after initiating the voting for the target voting option corresponding to the voting option control on which the trigger operation is performed, the method further comprises:

stopping displaying the voting option controls corresponding to the plurality of voting options;

wherein the method further comprises:

when the voting is ended, adjusting a display state of at least one voting option identifier displayed in the voting result region, so that a display state of a voting option identifier corresponding to a voting option corresponding to a voting count that meets a preset condition is different from a display state of a voting option identifier corresponding to a voting option corresponding to a voting count that does not meet the preset condition.

2. The method according to claim 1, wherein initiating, in response to the trigger operation for the voting option control, the voting for the target voting option corresponding to the voting option control on which the trigger operation is performed, and sending the comment corresponding to the target voting option, comprises:

in response to the trigger operation by users based on target voice broadcast information, initiating the voting for the target voting option corresponding to the voting option control on which the trigger operation is performed, and sending the comment corresponding to the target voting option, wherein the target voice broadcast information is voice broadcast information corresponding to the target voting provided by a streamer terminal of live streaming, and the voice broadcast information contains voting contents corresponding to the plurality of voting options, respectively.

3. The method according to claim 1, wherein after initiating the voting for the target voting option corresponding to the voting option control on which the trigger operation is performed, the method further comprises at least one of the following:

adjusting a display state of a target voting option identifier in the voting result region, wherein the target voting option identifier is a voting option identifier corresponding to the target voting option; or adjusting display states of other voting option identifiers than the target voting option identifier among a plurality of voting option identifiers in the voting result region.

4. The method according to claim 1, wherein after displaying the voting result region and the voting input region of the target voting in the live streaming page, the method further comprises:

updating sizes of display regions occupied by a plurality of voting option identifiers in the voting result region based on changes in the voting counts corresponding to the plurality of voting options.

5. The method according to claim 2, wherein after displaying the voting result region and the voting input region of the target voting in the live streaming page, the method further comprises:

updating sizes of display regions occupied by a plurality of voting option identifiers in the voting result region based on changes in the voting counts corresponding to the plurality of voting options.

6. The method according to claim 3, wherein after displaying the voting result region and the voting input region of the target voting in the live streaming page, the method further comprises:

updating sizes of display regions occupied by a plurality of voting option identifiers in the voting result region based on changes in the voting counts corresponding to the plurality of voting options.

7. The method according to claim 1, wherein adjusting the display state of the at least one voting option identifier displayed in the voting result region comprises at least one of the following:

adjusting a display state of a first voting option identifier displayed in the voting result region from a first original display state to a first target display state, wherein a voting option corresponding to the first voting option identifier is a voting option corresponding to a voting count that meets the preset condition; or adjusting a display state of a second voting option identifier displayed in the voting result region from a second original display state to a second target display state, wherein a voting option corresponding to the second voting option identifier is a voting option corresponding to a voting count that does not meet the preset condition.

8. A live voting apparatus, comprising:

an input region display module, configured to display a voting result region and a voting input region of a target voting in a live streaming page, wherein voting option identifiers corresponding to a plurality of voting options and voting counts corresponding to the plurality of voting options are displayed in the voting result region, and voting option controls corresponding to the plurality of voting options are displayed in the voting input region; and a voting module, configured to, in response to a trigger operation for a voting option control, initiate voting for a target voting option corresponding to the voting option control on which the trigger operation is performed, and send a comment corresponding to the target voting option;

wherein the live voting apparatus further comprises a display stopping module and a second state adjustment module, the display stopping module is configured to, after the voting is initiated for the target voting option corresponding to the voting option control on which the trigger operation is performed, stop displaying the voting option controls corresponding to the plurality of voting options;

wherein the second state adjustment module is configured to, when the voting is ended, adjust a display state of at least one voting option identifier displayed in the voting result region, so that a display state of a voting option identifier corresponding to a voting option corresponding to a voting count that meets a preset condition is different from a display state of a voting option identifier corresponding to a voting option corresponding to a voting count that does not meet the preset condition.

9. An electronic device, comprising:
at least one processor; and
a memory, configured to store at least one program;
wherein the at least one program, when executed by the at least one processor, cause the at least one processor to implement:

displaying a voting result region and a voting input region of a target voting in a live streaming page, wherein voting option identifiers corresponding to a plurality of voting options and voting counts corresponding to the plurality of voting options are displayed in the voting result region, and voting option controls corresponding to the plurality of voting options are displayed in the voting input region; and initiating, in response to a trigger operation for a voting option control, voting for a target voting option corresponding to the voting option control on which the trigger operation is performed, and sending a comment corresponding to the target voting option;

wherein after initiating the voting for the target voting option corresponding to the voting option control on which the trigger operation is performed, the at least one program, when executed by the at least one processor, further cause the at least one processor to implement:

stopping displaying the voting option controls corresponding to the plurality of voting options;

wherein the at least one program, when executed by the at least one processor, further cause the at least one processor to implement:

when the voting is ended, adjusting a display state of at least one voting option identifier displayed in the voting result region, so that a display state of a voting option identifier corresponding to a voting option corresponding to a voting count that meets a preset condition is different from a display state of a voting option identifier corresponding to a voting option corresponding to a voting count that does not meet the preset condition.

10. The electronic device according to claim 9, wherein the at least one program, when executed by the at least one processor, further cause the at least one processor to implement:

in response to the trigger operation by users based on target voice broadcast information, initiating the voting for the target voting option corresponding to the voting option control on which the trigger operation is performed, and sending the comment corresponding to the target voting option, wherein the target voice broadcast information is voice broadcast information corresponding to the target voting provided by a streamer terminal of live streaming, and the voice broadcast information contains voting contents corresponding to the plurality of voting options, respectively.

11. The electronic device according to claim 9, wherein after initiating the voting for the target voting option corresponding to the voting option control on which the trigger operation is performed, the at least one program, when executed by the at least one processor, further cause the at least one processor to implement:

adjusting a display state of a target voting option identifier in the voting result region, wherein the target voting option identifier is a voting option identifier corresponding to the target voting option; or adjusting display states of other voting option identifiers than the target voting option identifier among a plurality of voting option identifiers in the voting result region.

12. A non-transitory computer-readable storage medium, on which computer program is stored, wherein the computer program, when executed by a processor, implements the live voting method according to claim 1.

* * * * *